(12) United States Patent
Moe

(10) Patent No.: US 8,695,343 B2
(45) Date of Patent: Apr. 15, 2014

(54) ECONOMICAL AND SUSTAINABLE DISPOSAL OF ZERO LIQUID DISCHARGE SALT BYPRODUCT

(75) Inventor: Neil Edwin Moe, Minnetonka, MN (US)

(73) Assignee: General Electric Company, Schenectady, NY (US)

( * ) Notice: Subject to any disclaimer, the term of this patent is extended or adjusted under 35 U.S.C. 154(b) by 1166 days.

(21) Appl. No.: 12/631,248

(22) Filed: Dec. 4, 2009

(65) Prior Publication Data

US 2011/0131994 A1 Jun. 9, 2011

(51) Int. Cl.
*F01K 25/06* (2006.01)

(52) U.S. Cl.
USPC ............................................. 60/649; 60/673

(58) Field of Classification Search
USPC .......................................... 60/645, 649, 673
See application file for complete search history.

(56) References Cited

U.S. PATENT DOCUMENTS

| 3,906,250 | A | | 9/1975 | Loeb |
| 4,125,463 | A | | 11/1978 | Chenoweth |
| 4,141,825 | A | | 2/1979 | Conger |
| 4,171,409 | A | | 10/1979 | Loeb |
| 4,176,057 | A | | 11/1979 | Wheatley et al. |
| 4,193,267 | A | | 3/1980 | Loeb |
| 4,283,913 | A | * | 8/1981 | Loeb ............................ 60/641.9 |
| 4,434,057 | A | | 2/1984 | Marquardt |
| 5,102,547 | A | | 4/1992 | Waite et al. |
| 5,403,490 | A | | 4/1995 | Desai |
| 5,501,798 | A | | 3/1996 | Al-Samadi et al. |
| 5,593,563 | A | | 1/1997 | Denoncourt et al. |
| 5,725,767 | A | | 3/1998 | Culkin |
| 6,036,867 | A | | 3/2000 | Jogand et al. |
| 6,056,878 | A | | 5/2000 | Tessier et al. |
| 6,185,940 | B1 | * | 2/2001 | Prueitt ............................ 60/649 |
| 6,241,892 | B1 | | 6/2001 | Whitworth |
| 6,313,545 | B1 | | 11/2001 | Finley et al. |
| 6,410,672 | B1 | | 6/2002 | MacDonald et al. |
| 6,461,491 | B1 | | 10/2002 | Hryn et al. |
| 6,461,514 | B1 | | 10/2002 | Al-Samadi |
| 6,508,936 | B1 | | 1/2003 | Hassan |
| 6,537,456 | B2 | | 3/2003 | Mukhopadhyay |
| 6,998,053 | B2 | | 2/2006 | Awerbuch |

(Continued)

FOREIGN PATENT DOCUMENTS

| GB | 2195818 A | * | 4/1988 | ............. H01M 8/08 |
| JP | 2006021106 A | | 1/2006 | |

(Continued)

OTHER PUBLICATIONS

Statkraft—Power Point Presentation from Apr. 2007—Osmotic Power—A New Renewable Energy Source.

(Continued)

*Primary Examiner* — Thomas Denion
*Assistant Examiner* — Mickey France
(74) *Attorney, Agent, or Firm* — Wegman, Hessler & Vanderburg

(57) ABSTRACT

A method and apparatus are described for disposing of salt byproduct from a zero liquid operation, such as a zero liquid discharge desalination plant. The present method and apparatus concern a power generation plant, comprising a salinity gradient power unit (SGPU) comprising a high salinity feed, a low salinity feed, and a mixed water output. The high salinity feed is comprised of salt byproduct from a ZLD operation. The mixed water output empties into a body of water.

5 Claims, 12 Drawing Sheets

(56) References Cited

U.S. PATENT DOCUMENTS

| | | |
|---|---|---|
| 7,083,730 B2 | 8/2006 | Davis |
| 7,144,511 B2 | 12/2006 | Vuong |
| 7,239,037 B2 | 7/2007 | Alstot et al. |
| 7,306,724 B2 | 12/2007 | Gordon |
| 7,459,088 B2 | 12/2008 | Davis |
| 7,470,366 B2 | 12/2008 | Queen et al. |
| 7,501,064 B2 | 3/2009 | Schmidt et al. |
| 7,514,001 B2 | 4/2009 | Costa et al. |
| 7,563,370 B2 | 7/2009 | Thorsen et al. |
| 8,123,948 B2* | 2/2012 | Jensen .......................... 210/652 |
| 2004/0079704 A1 | 4/2004 | Garde et al. |
| 2006/0196836 A1 | 9/2006 | Arakel et al. |
| 2006/0225420 A1* | 10/2006 | Al-Mayahi et al. ............. 60/645 |
| 2008/0067069 A1 | 3/2008 | Gifford et al. |
| 2008/0230376 A1 | 9/2008 | Brauns |
| 2009/0071902 A1* | 3/2009 | Stover et al. .................. 210/637 |
| 2009/0159448 A1 | 6/2009 | Cai et al. |
| 2010/0212319 A1* | 8/2010 | Donovan ........................ 60/649 |
| 2011/0044824 A1* | 2/2011 | Kelada ............................ 417/53 |

FOREIGN PATENT DOCUMENTS

| | | |
|---|---|---|
| WO | 0213955 A1 | 2/2002 |
| WO | WO 03/067082 A1 | 8/2003 |
| WO | 2004041731 A1 | 5/2004 |
| WO | WO 2007/134226 A1 | 11/2007 |
| WO | WO 2008/060435 A2 | 5/2008 |
| WO | WO 2009/152148 A1 | 12/2009 |

OTHER PUBLICATIONS

Statkraft—Power Point Presentation—Osmotic Power—A Huge Renewable Energy Source.
Wikipedia—article regarding Reverse Electrodialysis—http://en.wikipedia.org/wiki/Reverse_electrodialysis.
Wikipedia—article regarding Reverse Osmosis—http://en.wikipedia.org/wiki/Reverse_Osmosis.
Membrane Technology Group—Power Generation by Reverse Electrodialysis—http://mtg.tnw.utwente.nl/teaching/assign/blue.
Leonardo-Energy.Org—Reverse Electrodialysis—http://www.leonardo-energy.org/23-reverse-electrodialysis.
Sanitation Districts of Los Angeles County—Joint Water Pollution Control Plant—http://www.lacsd.org/about/wastewater_facilities/jwpcp/default.asp.
Thorsen and Holt, Journal of Membrane Science vol. 335 (2009), p. 103-110, The potential for power production from salinity gradients by pressure retarded osmosis.
Achilli et al., Journal of Membrane Science vol. 343 (2009), p. 42-52. Power generation with pressure retarded osmosis: an experimental and theoretical investigation.
Skilhagen et al., Desalination vol. 220 (2008), p. 476-482. Osmotic power—power production based on the osmotic pressure difference between waters with varying salt gradients.
Post et al., Journal of Membrane Science vol. 288 (2007), p. 218-230. Salinity-gradient power: evaluation of pressure-retarded osmosis and reverse electrodialysis.
Olsson et al, Science vol. 206 (1979), p. 452-454. Salinity gradient power: utilizing vapor pressure differences.
Mickley, WateReuse Foundation report (2008) p. 15-29. Survey of high-recovery and zero liquid discharge technologies for water utilities.
Mickley, Desalination and Water Purification Research and Development Program Report No. 155 (2009). Treatment of concentrate.
California Coastal Commission, Seawater Desalination and the California Coastal Act, Mar. 2004.
R.C. Weast, ed., CRC Handbook of Chemistry and Physics, 66th Edition (1985-1986), CRC Press, Inc., Boca Raton, Florida pp. D-253-D-254.).
M.E. Guendouzi et al., "Water activities, osmotic and activity coefficients in aqueous chloride solutions at T = 298.15 K by the hygrometric method", J. Chem. Thermodynamics 33 (2001) 1059-1072.).
Doyle, Reuters, Salt could shake up world energy supply, Mar. 18, 2008.
Search Report and Written Opinion from corresponding PCT Application No. PCT/US2010/055345 dated Feb. 18, 2013.
M.E. Guendouzi et al., "Water activities, osmotic and activity coefficients in aqueous chloride solutions at T = 298.15 K by the hygrometric method", J. Chem. Thermodynamics, 33 (2001) pp. 1059-1072.
Statkraft—Informational Material—Osmotic Power—A Huge Renewable Energy Source (2006).
Leonardo Energy.Org—Reverse Electrodialysis—http://www.leonardo-energy.org/23-reverse-electrodialysis, Jun. 1, 2009.
Membrane Technology Group—Power Generation by Reverse Electrodialysis—http://mtg.tnw.utwente.nl/teaching/assign/blue, Jun. 1, 2009.
Wikipedia—article regarding Reverse Electrodialysis—http://en.wikipedia.org/wiki/Reverse_electrodialysis (2009).
Wikipedia—article regarding Reverse Osmosis—http://en.wikipedia.org/wiki/Reverse_Osmosis (2009).
Sanitation Districts of Los Angeles County—Joint Water Pollution Control Plant—http://www.lacsd.org/about/wastewater_facilities/jwpcp/default.asp, Oct. 14, 2010.

* cited by examiner

ECONOMICAL AND SUSTAINABLE DISPOSAL OF ZERO LIQUID DISCHARGE SALT BYPRODUCT

FIELD OF THE INVENTION

The invention is related to the eco-friendly disposal of zero liquid discharge desalination plant salt byproduct and sustainable development of inland brackish water resources.

STATE OF THE ART

Desalination technologies typically operate by dividing a single aqueous feed stream into two output streams: a product whose properties are tailored to end-use (such as potable water), and a waste stream that contains most of the original salts (and other contaminants) at elevated concentration. Currently, disposal of high salinity desalination streams poses significant problems, especially for inland brackish water desalination units, and is deemed to be a major impediment to implementation of desalination technologies. Discharge of the high salinity waste stream back into the environment inevitably results in an increase in the salinity of either local water sources or those downstream, so it is clearly not sustainable. Sequestration of the high salinity byproduct by injection into deep wells is limited to specific geographic regions and is characterized by high cost and uncertainty about the eventual fate of the high salinity liquid (e.g., will it eventually leach into the groundwater supply?).

There has been much recent activity around "zero liquid discharge" (ZLD) technologies that operate on high salinity waste streams from desalination. These technologies enable enhanced recovery of water and reduce the desalination byproducts to solid salts or slurries. Currently, ZLD technologies rely heavily on expensive and energy-intensive thermal units, such as brine concentrators and crystallizers, or land-intensive evaporation ponds. Recent and near-future technological developments are reducing the cost of ZLD by reducing the size of thermal units, as shown in the ZLD scenario tables below. In the United States today, ZLD is practiced by about 120 industrial facilities, mostly power plants. Municipalities have yet to adopt ZLD, but this picture is on the verge of changing as increasing water scarcity and decreasing cost of ZLD converge.

| | ZLD scenarios | | |
|---|---|---|---|
| | % recovery | | |
| | 70% | 99% | 100% |
| Unit | RO | evaporator | crystallizer |
| High salinity stream concentration (ppm) | 6,700 | 200,000 | solid |
| Incremental power requirement (kWh/m$^3$) | 0.8 | 22 | 66 |
| Cumulative power requirement (kWh/m$^3$) | 0.8 | 7.0 | 7.6 |

| | ZLD scenarios | | |
|---|---|---|---|
| | % recovery | | |
| | 95% | 99% | 100% |
| Unit | RO | evaporator | crystallizer |
| High salinity stream concentration (ppm) | 40,000 | 200,000 | solid |
| Incremental power requirement (kWh/m$^3$) | 1.0 | 22 | 66 |
| Cumulative power requirement (kWh/m$^3$) | 1.0 | 1.8 | 2.5 |

However, in spite of greatly reducing the volume of the desalination byproduct, ZLD does not solve the problem of ultimate disposal, which remains significant. For example, a large brackish water desalination plant that treats 100,000 m$^3$/day of 2000 ppm salt water produces nearly 200 metric tons of salt waste per day, or likely more if chemical softening processes are used. The cost of landfilling the salt at $50 per ton would be $10,000 per day, or $3,500,000 per year. In addition to the high cost, landfilling does not qualify as a sustainable solution because of ever-increasing land use and the possibility of leaching.

The sustainable solution to inland desalination is to find uses for the salt byproduct, transforming today's waste into valuable products. In fact, processes have been developed to extract relatively pure salts such as magnesium hydroxide, calcium carbonate, and sodium chloride from high salinity desalination streams. However, the extraction processes tend to be complex and expensive, and markets for salts produced on the necessary scales may not exist or may quickly become saturated. As a result, a need persists for cost effective and environmentally friendly disposal or reuse methods for the high salinity desalination stream from zero liquid discharge desalination plants.

Another historically low-value stream is effluent from municipal wastewater treatment plants (WWTP). After primary and secondary treatment, most municipal wastewater is reinjected back into the environment. In coastal regions, pipelines are typically laid on (or under) the seabed and carry the effluent several hundred yards or even miles offshore. Such discharges to the ocean are of particular environmental concern because of the large salinity and density differences between municipal wastewater (500-2000 ppm typically) and seawater (30,000-50,000 ppm typically). Wastewater discharges create plumes of low density, low salinity water that can be locally disruptive and have to be carefully managed.

The scale of contemporary wastewater disposal at sea is vast, as two examples given below will attest. The first is the Joint Water Pollution Control Plant (JWPCP), a large wastewater treatment plant on the west coast of the United States. The JWPCP provides primary and secondary treatment for the collective wastewater of 3.5 million residents of Los Angeles County before ejecting the effluent into the Pacific Ocean. The volume of this stream is $1.14 \times 10^6$ m$^3$/day, or roughly ten times larger than the capacity of the largest desalination plant in the United States. The outflow of the JWPCP comprises about 20% of southern California's total wastewater discharge to sea. The second example is the city of Singapore, where in 2006, $1.4 \times 10^6$ m$^3$/day of wastewater was treated by Public Utilities Board (PUB) at various facilities, and $1.2 \times 10^6$ m$^3$/day was discharged. The scale of the discharges is directly related to the low perceived value of the wastewater and the difficulty of finding appropriate and affordable applications for large amounts of recycled water.

Recycled wastewater has become an increasingly important source of useable water in regions suffering from water scarcity, and there are many initiatives being discussed or implemented to increase recycling and reuse. However, there are natural limits associated with how much wastewater can be recycled and effectively reused. First, demand for lower quality water is limited to applications such as construction sites, irrigation, or certain industrial uses. Infrastructure for distribution must be established, which may be costly. On the other hand, advanced tertiary treatment technology required to upgrade secondary effluent for indirect potable reuse such as groundwater recharge is expensive, and again distribution infrastructure needs to be built. Even with investment in such expensive tertiary treatment technology, public resistance to perceived "toilet-to-tap" recycling projects has been large; thus, the need persists for less expensive and less controversial means to extract value from municipal wastewater.

It is known that salinity gradient power can be produced by different approaches, using contrasting streams of high and low salinity. The two most well known power generation processes are membrane-based, called pressure retarded osmosis (PRO) and reverse electrodialysis (RED). PRO and RED are described in the following patents publications U.S. Pat. No. 7,563,370, U.S. Pat. No. 4,193,267, U.S. Pat. No. 4,171,409, U.S. Pat. No. 3,906,250, and US 2006/0196836A1, each of which is herein incorporated by reference. Although pilot-scale demonstrations of both PRO and RED are under way in Europe, neither technology has ever been deployed commercially. The application being considered in these pilot studies is the use of the salinity difference between rivers and oceans to generate power within estuaries. The commercial viability of PRO and RED depends on the ability to generate the greatest amount of power using the smallest membrane area. Unfortunately, most analyses of river water/ocean water power generation using currently available membranes show that the cost of membranes needs to be unrealistically low in order for the process to be commercially viable. Greater salinity differences between high and low salinity streams and more efficient membranes having higher permeability would improve commercial prospects.

SUMMARY OF INVENTIVE FEATURES

The present invention concerns a power generation plant, comprising a salinity gradient power unit (SGPU) comprising a high salinity feed, a low salinity feed, and a mixed water output. The high salinity feed is comprised of salt byproduct from a ZLD operation. The mixed water output empties into a body of water.

DETAILED DESCRIPTION OF EXEMPLARY EMBODIMENTS

The invention will now be described with reference to the drawings, wherein preferred embodiments are described in detail to enable practice of the invention. Although the invention is described with reference to these specific preferred embodiments, it will be understood that the invention is not limited to these preferred embodiments. To the contrary, the invention includes numerous alternatives, modifications, and equivalents as will become apparent from consideration of the following detailed description.

Figure 1:
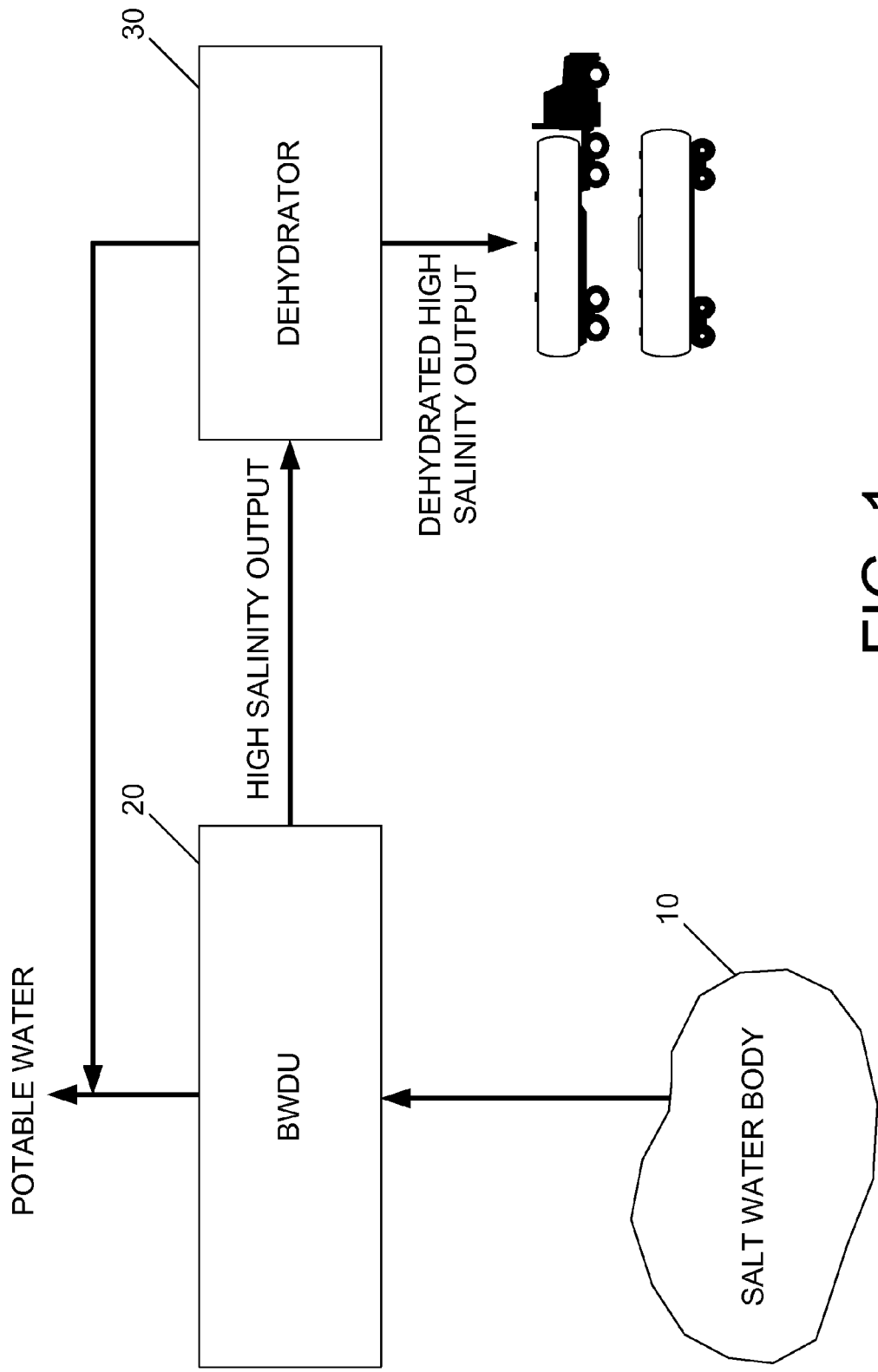
FIG. 1 represents an inland brackish water desalination unit (BWDU) and dehydrator unit arrangement resulting in ZLD.
Figure 2:
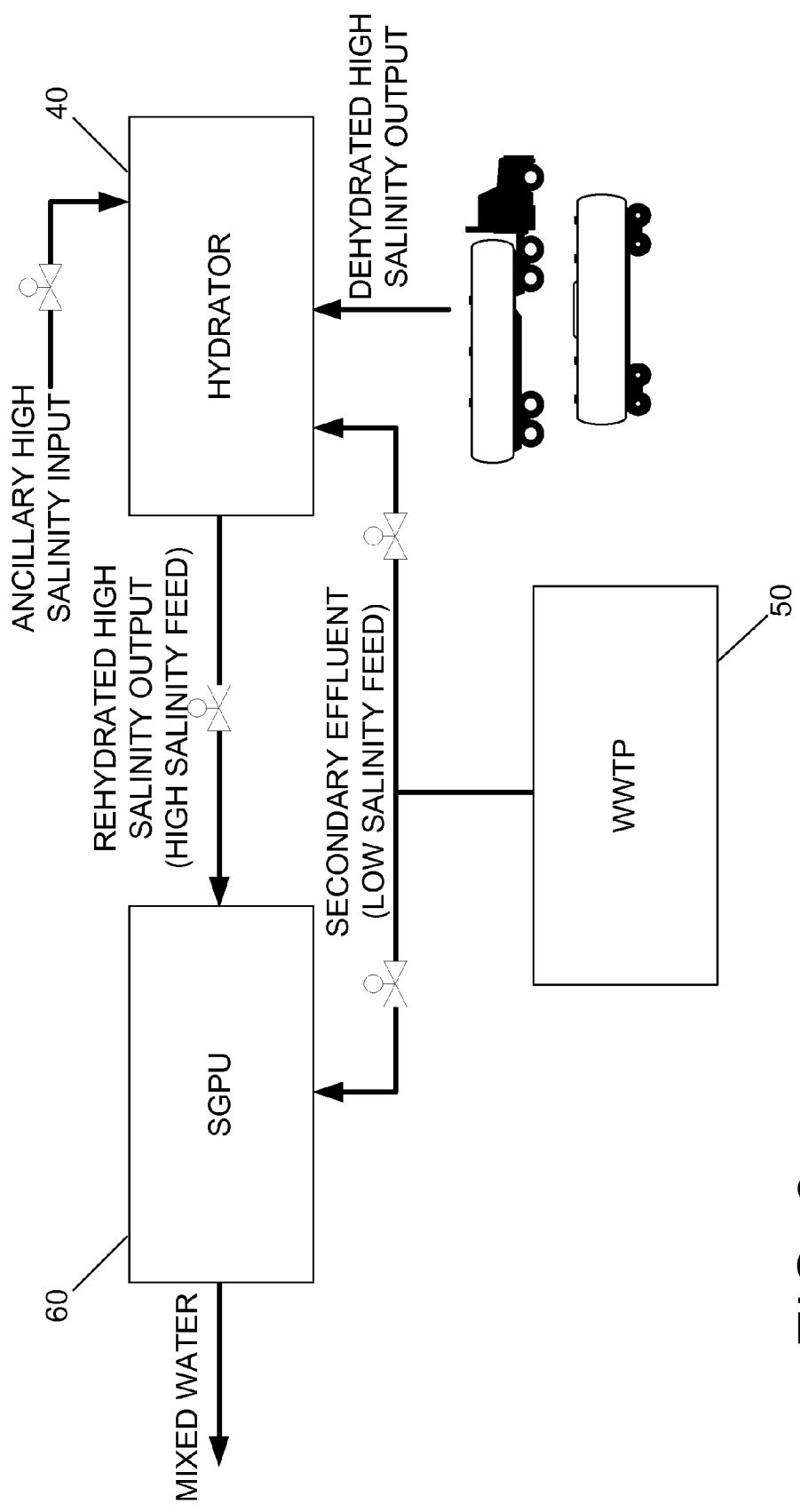
FIG. 2 represents a SGPU and hydrator arrangement according to the present invention.

Referring now to the drawings, FIG. 1 shows an inland BWDU 20 that desalinates water drawn from a salt water body 10 and produces both useable water and a high salinity output. In ZLD processes, the high salinity output may be further treated in a dehydrator 30 which removes useable water from the high salinity output and dehydrates the remainder of the high salinity output. Some of the useable water produced by dehydrator 30 is potable water. In one embodiment, it is contemplated that dehydrator 30 is comprised of a brine concentrator evaporator unit that concentrates the salts and a crystallizer unit or evaporation pond to recover or drive off the remaining water. The salinity level of the useable water is usually less than or equal to 500 ppm, and the high salinity output is solid salts or slurries. The dehydrated high salinity output is then transported off-site to hydrator 40 at a SGPU 60, as depicted in FIG. 2. The dehydrated high salinity output can be transported using a variety of methods, including by truck, train, boat, or pipeline.

In FIG. 2, the dehydrated high salinity output is rehydrated in hydrator 40. In one embodiment, low salinity water is used to rehydrate the dehydrated high salinity output. The rehydrated high salinity output is supplied to the SGPU and used as the high salinity feed. Low salinity water is also supplied to the SGPU and used as the low salinity feed. In the preferred embodiment, this low salinity feed is the secondary effluent from a WWTP 50. It is contemplated that in some embodiments river water can be used as the low salinity feed. Additionally, it is contemplated that in some embodiments the ancillary high salinity input of hydrator 40 can be used to rehydrate the dehydrated high salinity output with high salinity liquids, including brine, such as the concentrate stream from a seawater desalination plant, or seawater.

Further, the flow rates of the low salinity feed provided to the SGPU 60, low salinity water provided to hydrator 40, ancillary high salinity input provided to hydrator 40, and rehydrated high salinity output provided to the SGPU 60 are adjustable.

The adjustable flow rate of the water into hydrator 40, along with pH and temperature, can be used to control the salinity level of the rehydrated high salinity output. High salinity outputs having different compositions may be blended in order to control the concentrations of individual ions within the rehydrated high salinity output. The flow rates of the rehydrated high salinity output and low salinity feed that enters the high salinity stream in the SGPU 60 control the salinity level of the mixed water output of the SGPU 60. The required salinity level of the mixed water output varies depending upon the salinity of the body of water into which it empties. In certain cases it may be desirable that the salinity and density of the mixed water is substantially equivalent to that of the receiving body of water; in other cases it may be desirable that the salinity and density of the mixed water is less than that of the receiving body of water in order to maintain positive buoyancy. For embodiments that use secondary effluent from a WWTP 50 as the low salinity feed, the addition of salt to the secondary effluent will increase its concentration and density and may make the discharge more environmentally friendly.

Figure 3A:
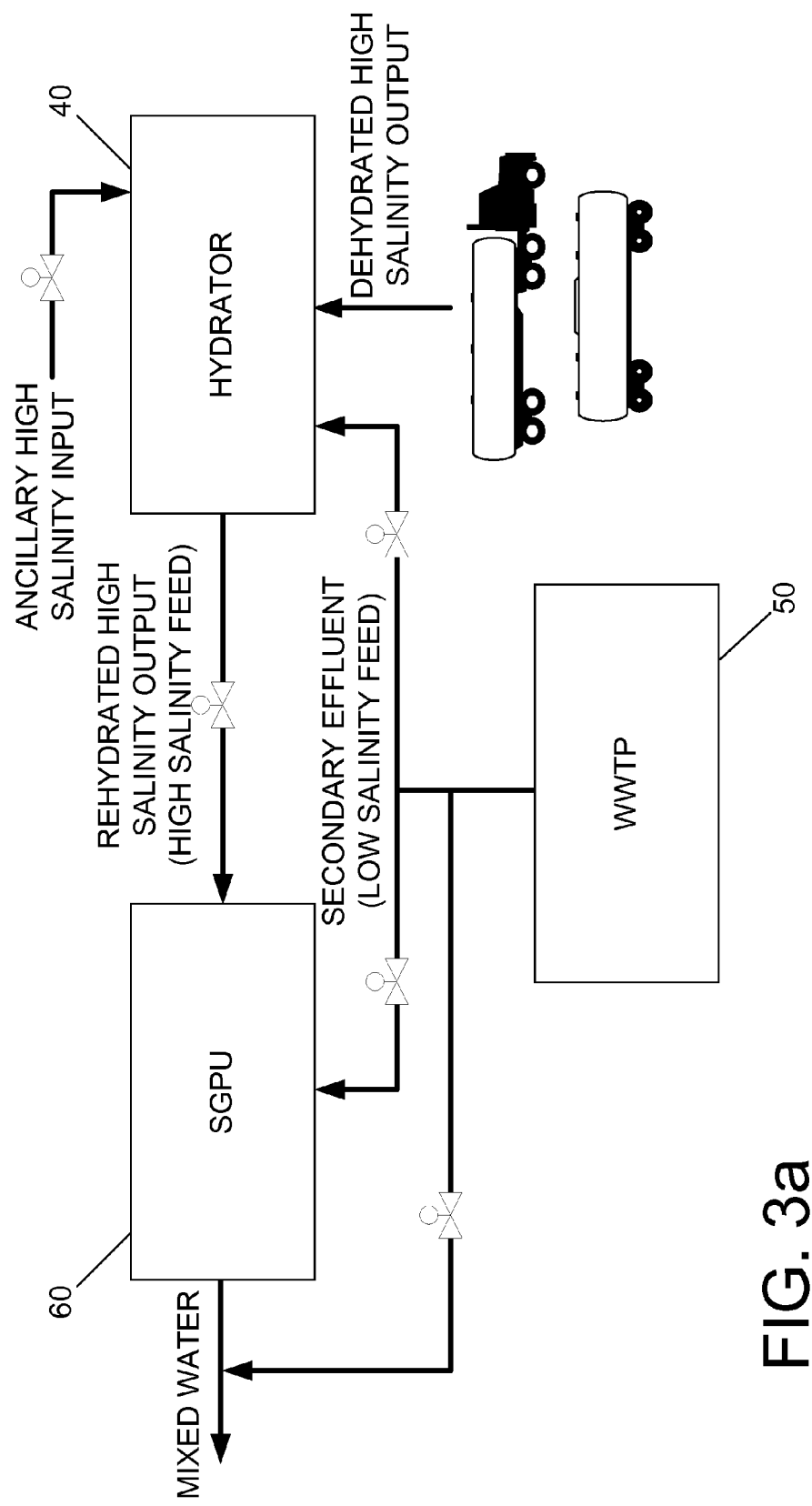
FIGS. 3a-e represent alternative SGPU and hydrator arrangements according to the present invention.
Figure 3B:
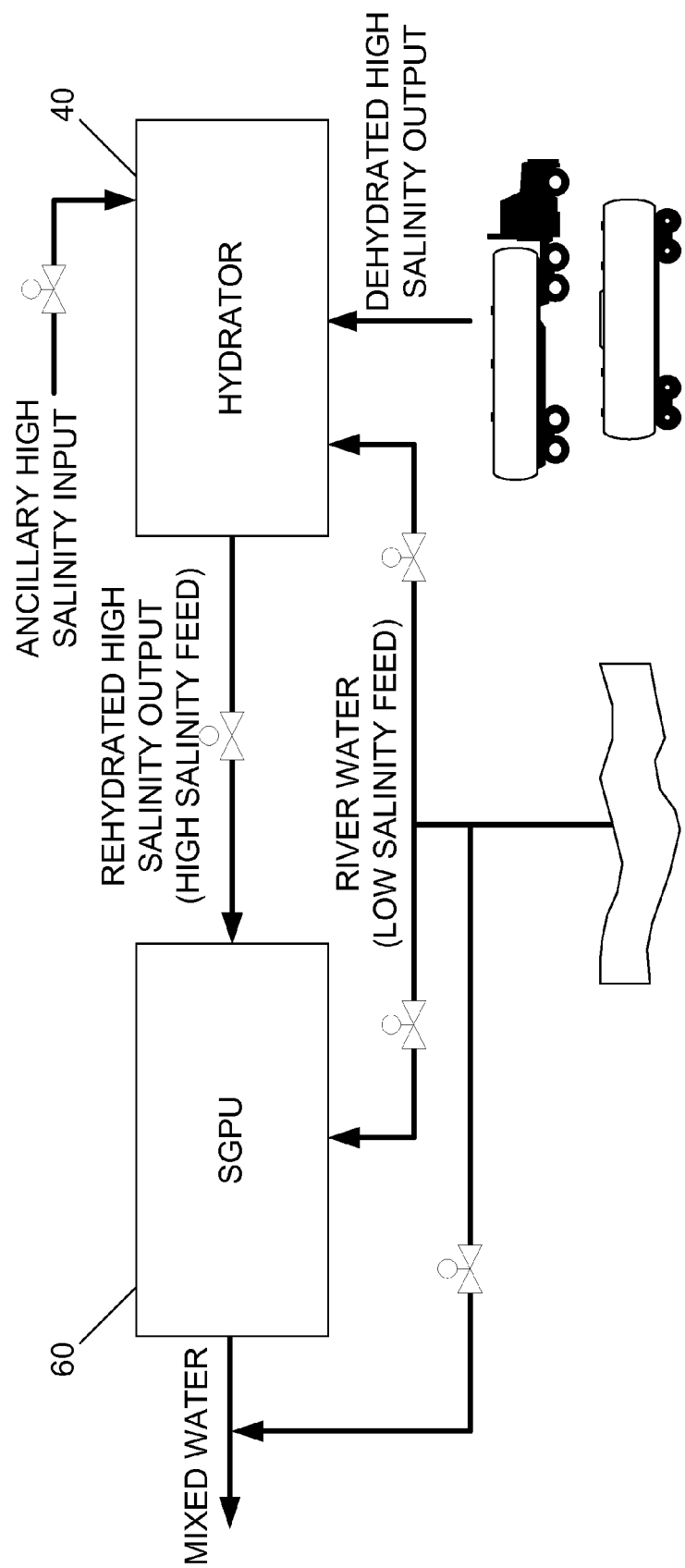

FIG. 3a represents a case in which low salinity feed bypasses the SGPU 60 and dilutes the mixed water output prior to discharge. In this embodiment, secondary effluent from WWTP 50 is used as the SGPU 60 low salinity feed and to hydrate the dehydrated high salinity output. FIG. 3b represents an embodiment in which river water is used as the SGPU 60 low salinity feed and to hydrate the dehydrated high salinity output in hydrator 40.

Figure 3C:
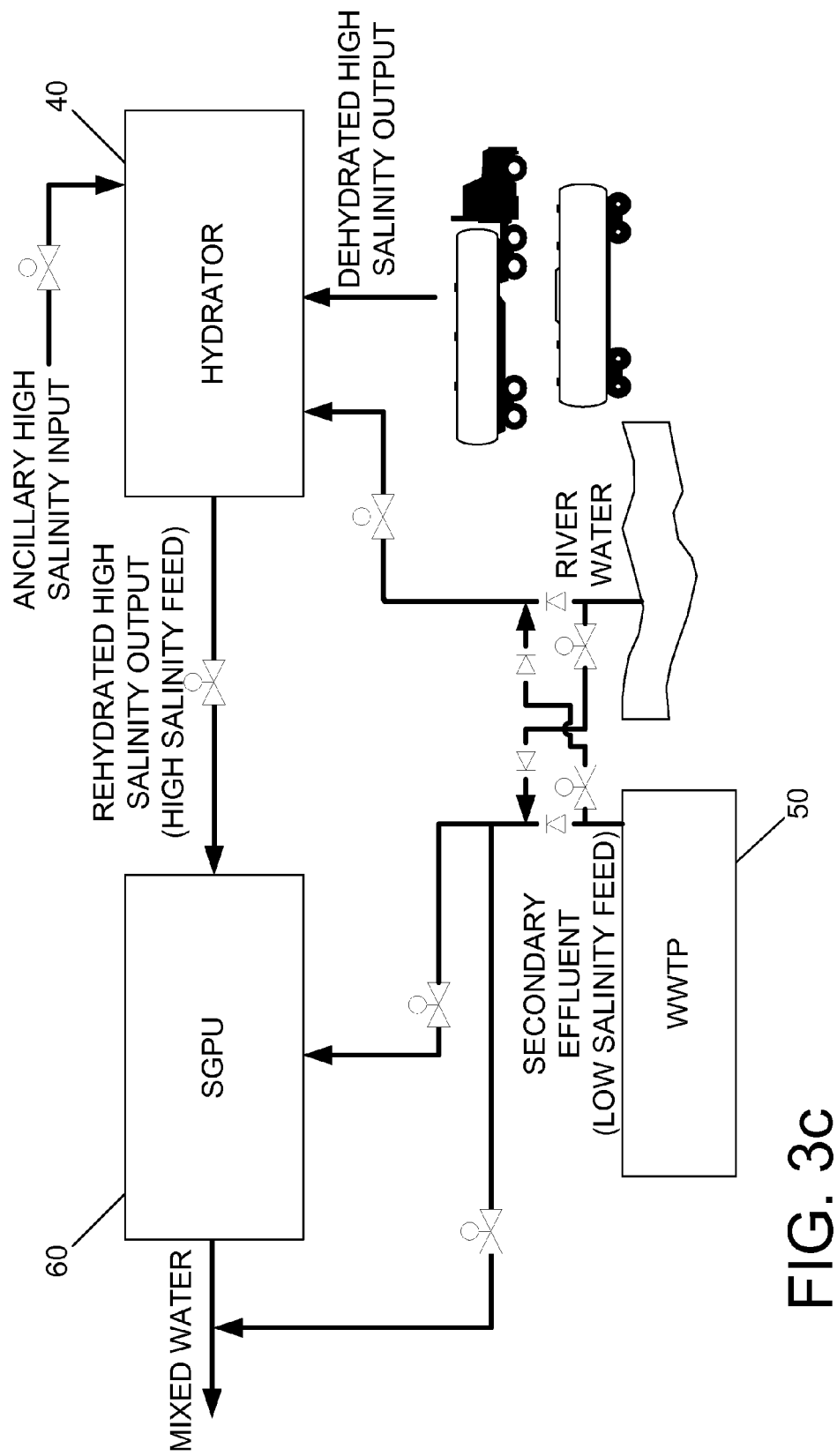

FIG. 3c represents an embodiment in which secondary effluent from a WWTP 50 is used as the SGPU 60 low salinity feed, and river water is used to hydrate the dehydrated high salinity output in hydrator 40. As can be seen, a pathway is provided that allows a combination of secondary effluent from a WWTP 50 and river water to be used at the SGPU 60 low salinity feed and to hydrate the dehydrated high salinity output.

Figure 3D:
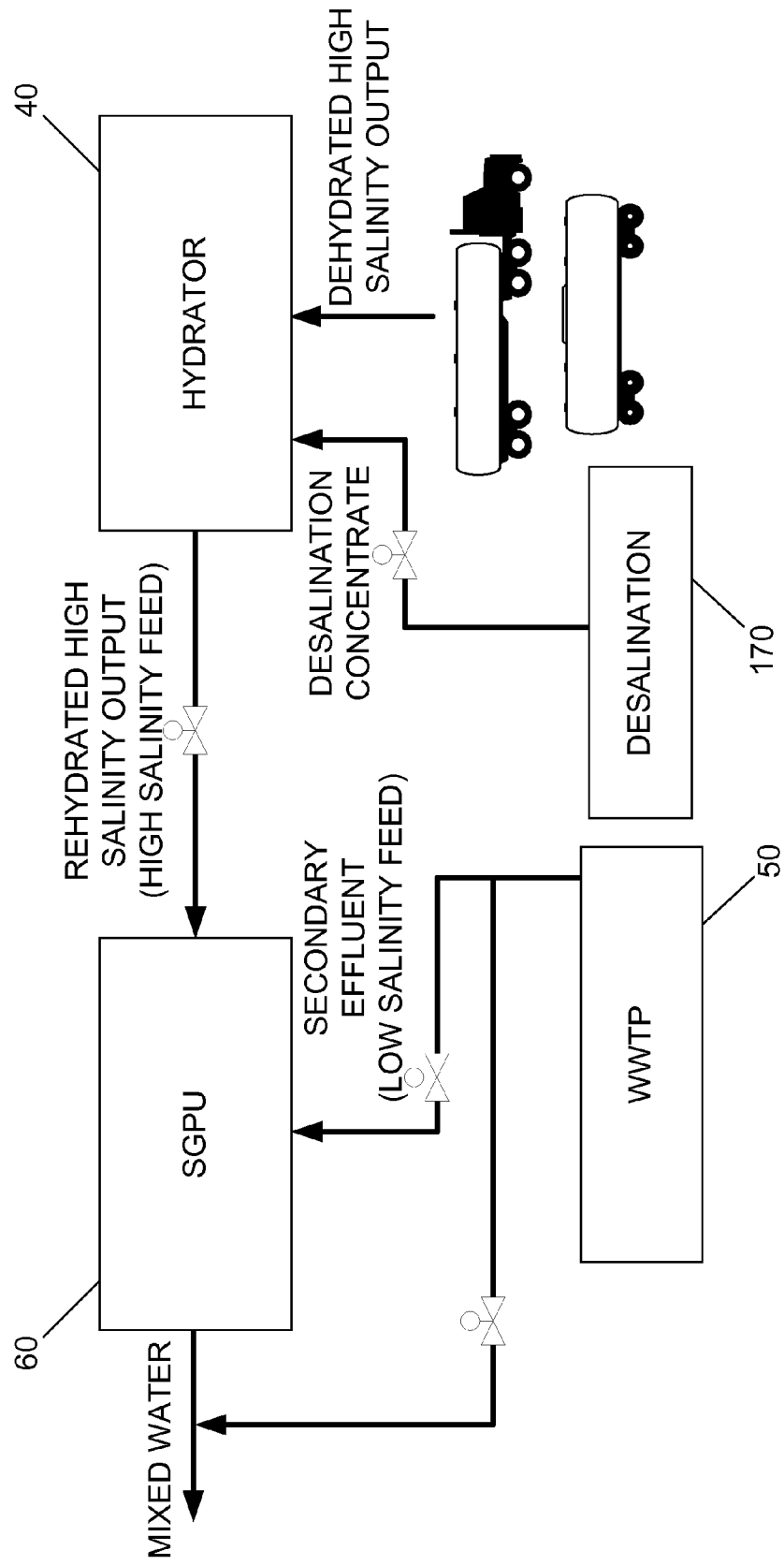

FIG. 3d represents an embodiment in which secondary effluent from a WWTP 50 is used as the SGPU 60 low salinity feed, and concentrate stream from a seawater desalination plant is used to hydrate the dehydrated high salinity output in hydrator 40.

Figure 3E:
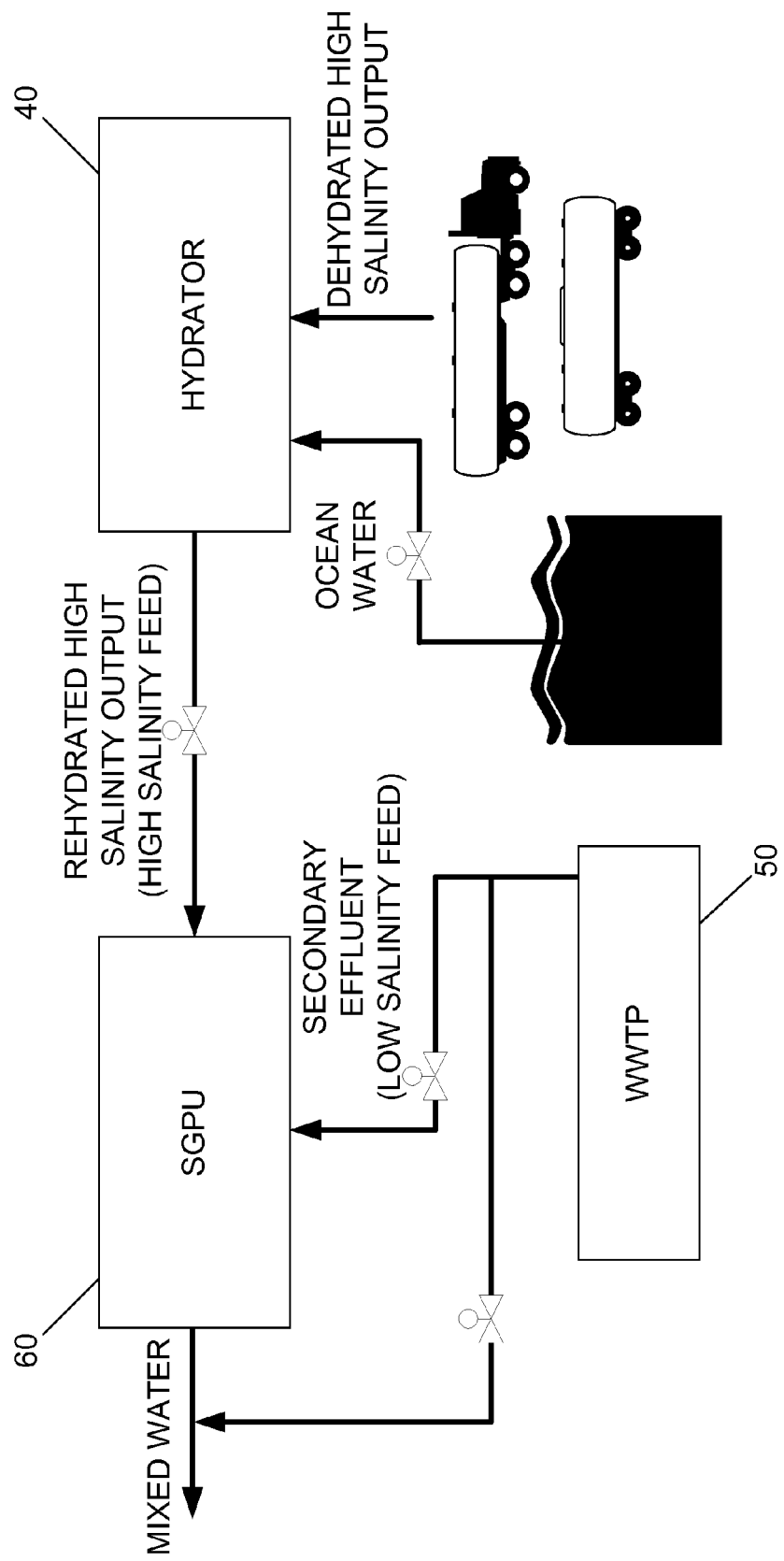

FIG. 3e represents an embodiment in which secondary effluent from a WWTP 50 is used as the SGPU 60 low salinity feed, and ocean water is used to hydrate the dehydrated high salinity output in hydrator 40.

Figure 4:
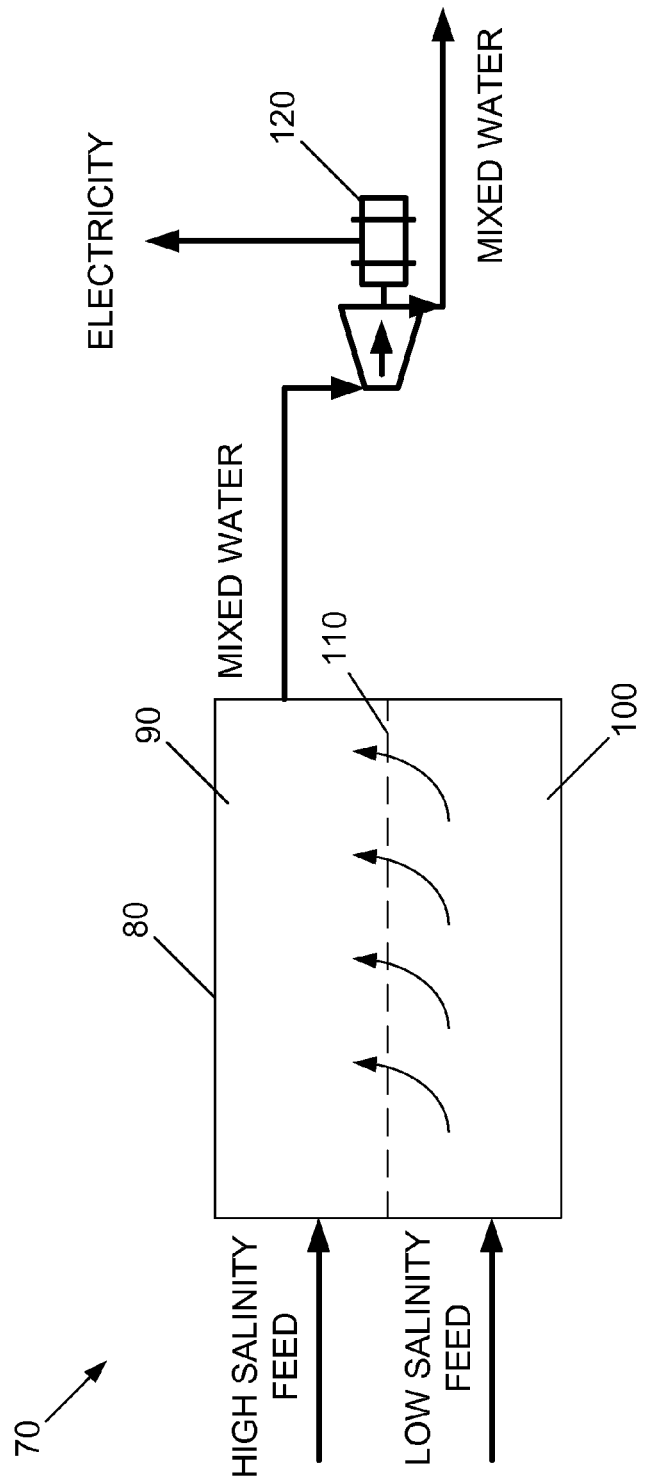
FIG. 4 represents a PRO unit arrangement according to the present invention.

FIG. 4 represents a PRO unit 70 arrangement that can be used in the SGPU. In the PRO unit 70, there is shown a vessel 80 divided into a pressurized high salinity chamber 90 and an unpressurized low salinity chamber 100. The high salinity feed is directed into the high salinity chamber 90, while the low salinity feed is directed into the low salinity chamber 100. The two chambers are separated by a semipermeable membrane 110 that allows the contents of the low salinity chamber 100 to permeate into the high salinity chamber 90, while retaining the contents of the high salinity chamber 90. The hydraulic pressure difference between the liquids on the opposite faces of the membrane 110 is less than the osmotic pressure difference between the liquids. The chemical potential difference between the contents of the high salinity chamber 90 and low salinity chamber 100 causes the transport of water from the low salinity chamber 100 to the high salinity chamber 90 and the pressurization of the volume of transported water, which is converted to electrical power by a hydroturbine 120. The application of hydrostatic pressure to the rehydrated high salinity output will partly retard the water transport. The water flowing from the high salinity chamber 90 to the hydroturbine 120 is a mixture of low salinity feed and the high salinity feed. Power production from the PRO unit 70 is influenced by the osmotic pressure difference between the two solutions, the relative flow rates of the two input streams, temperature, hydraulic pressure, and membrane properties. Water exiting the hydroturbine 120 is routed to the SGPU mixed water output.

The power generation capability of PRO unit 70 improves at higher water temperatures due to increased osmotic pressure driving force and increased membrane permeability. Waste heat such as the byproduct from power generation can be advantageously used to heat the low salinity feed and/or high salinity feed to boost the power output of PRO unit 70 and more fully utilize existing energy resources.

Figure 5:
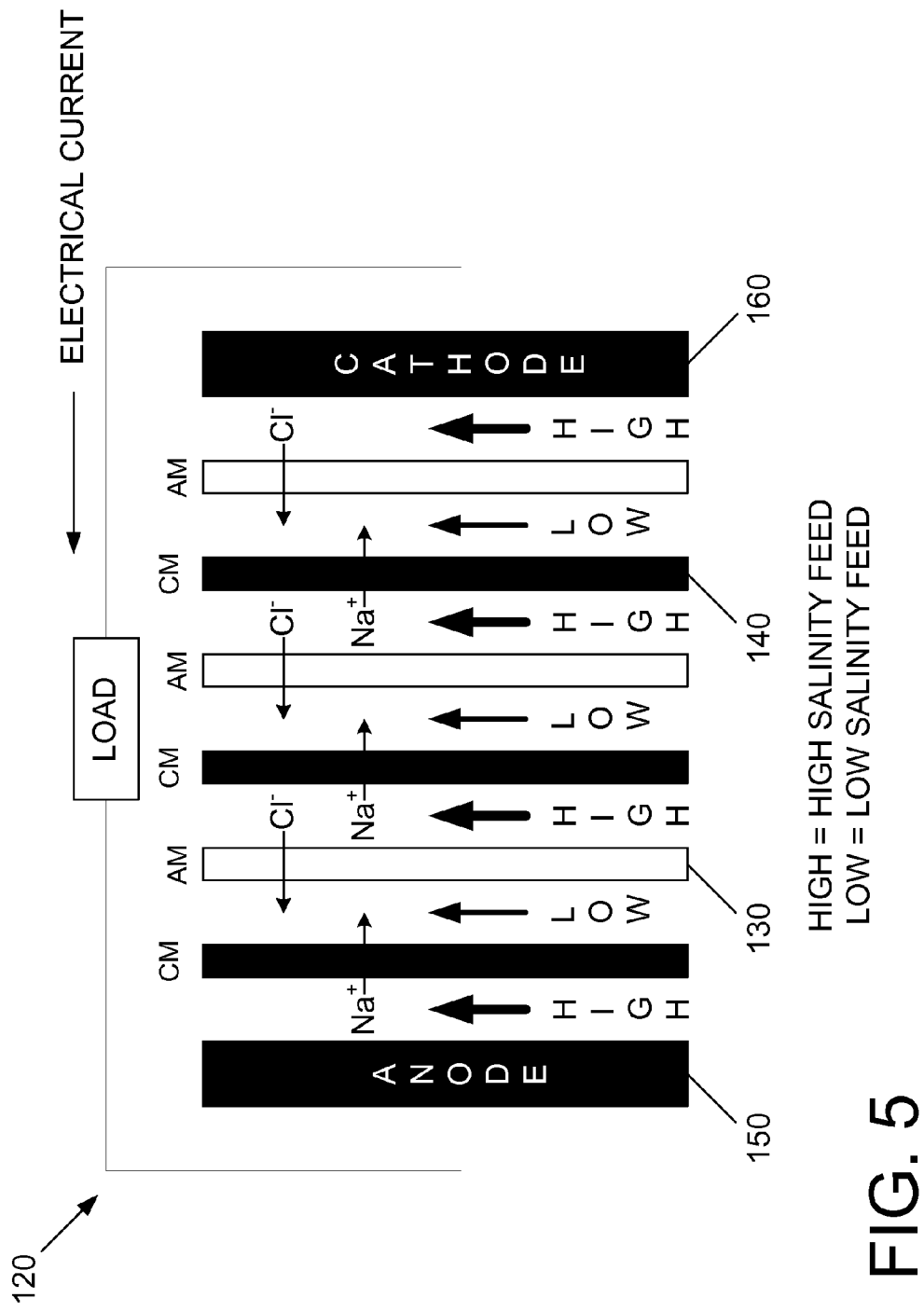
FIG. 5 represents a RED unit arrangement according to the present invention.

FIG. 5 represents a RED unit 120 arrangement that can be used in the SGPU. In the RED unit 120, cation membranes (CM) 140 and anion membranes (AM) 130 are arranged in an alternating sequence, thereby producing high salinity compartments and low salinity compartments. The high salinity feed is directed into the high salinity compartments, while the low salinity feed is directed into the low salinity compartments. Since the concentration of salt ions in the high salinity compartments is higher than the salt ions in the low salinity compartments, the sodium cations diffuse from the high salinity compartments through the CM 140 into the low salinity compartments. Further, the chloride anions from the high salinity compartments diffuse through the AM 130 into the low salinity compartments. This charge separation produces a chemical potential difference over each membrane that can be utilized directly as electrical energy through the electrical voltage invoked across the anode and cathode, and thus an electrical current through an electrical load. The total electrical energy production capacity of the RED unit 120 is determined by a number of factors including the number of membranes in the stack, the absolute temperature and ratio of the concentrations of the solutions in the high and low salinity compartments, the internal resistance of the RED unit 120, and the electrode properties. Water output exiting the high and low salinity compartments mixes together and becomes the SGPU mixed water output.

The power generation capability of RED unit 120 improves at higher water temperatures due to greater ionic mobility and decreased resistance in the solution chambers. Waste heat such as the byproduct from power generation can be advantageously used to heat the low salinity feed and/or high salinity feed to boost the power output of RED unit 120 and more fully utilize existing energy resources.

Figure 6:
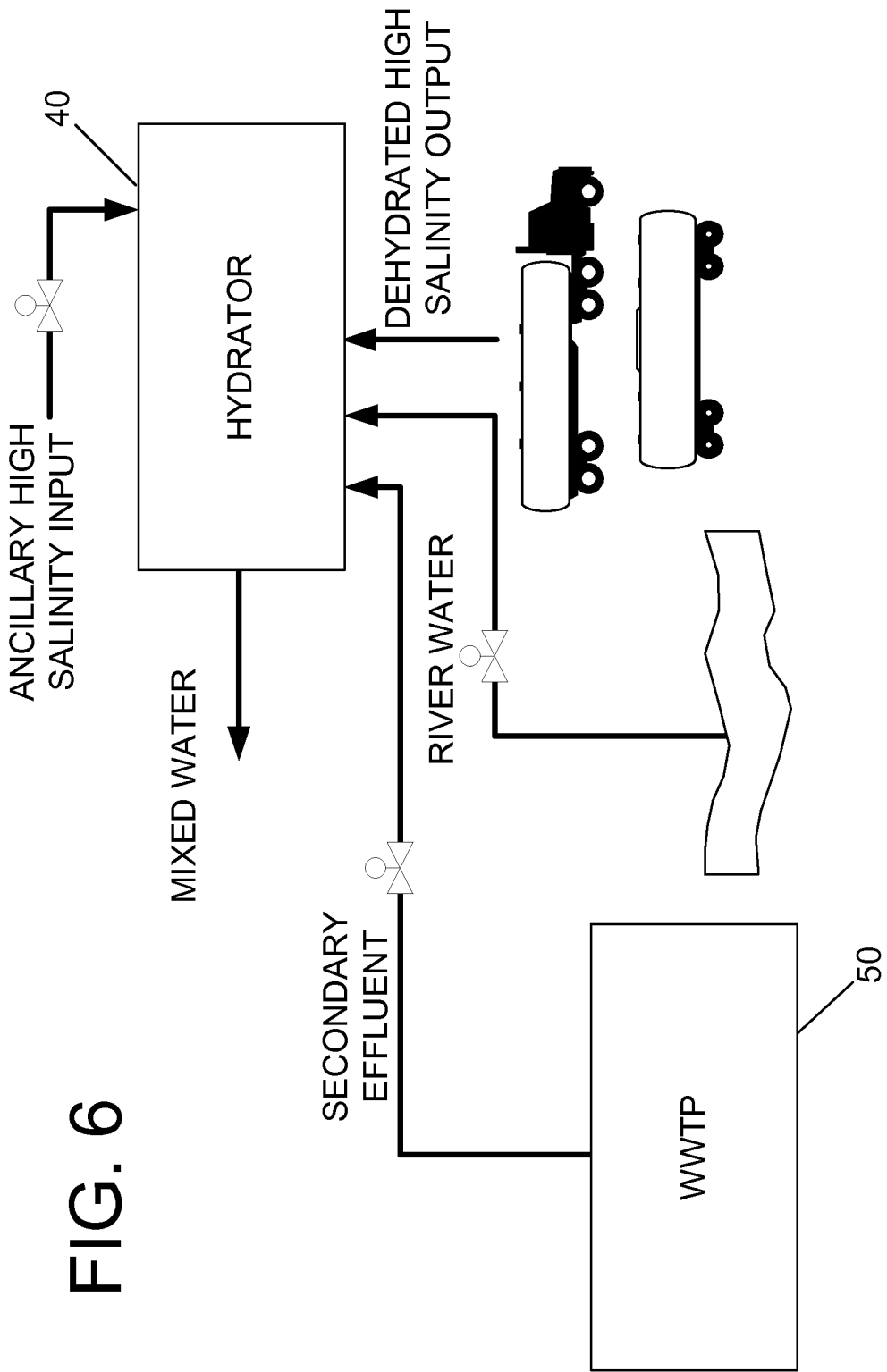
FIG. 6 represents a hydrator used to combine high and low salinity water for discharge.

FIG. 6 represents a configuration in which the dehydrated high salinity output is rehydrated in a hydrator 40 and the mixed water is discharged from hydrator 40 into a receiving body of water. This configuration can be useful during SGPU construction or when the SGPU is offline. In one embodiment, low salinity feed is used to rehydrate the dehydrated high salinity output. In the preferred embodiment, this low salinity feed is the secondary effluent from a WWTP 50. It is contemplated that in some embodiments, river water can be used as the low salinity feed. Additionally, it is contemplated that in some embodiments, high salinity brine, such as the concentrate stream from a seawater desalination plant, or seawater can be used to rehydrate the dehydrated high salinity output through the ancillary high salinity input of hydrator 40. Further, it is contemplated that some embodiments rehydrate the dehydrated high salinity output using a combination of two or more of the following: river water, high salinity brine, or seawater.

The adjustable flow rate of the water into hydrator 40, along with pH and temperature, can be used to control the salinity level of the rehydrated high salinity output. High salinity outputs having different compositions may be blended in order to control the concentrations of individual ions within the rehydrated high salinity output. The required salinity level of the mixed water output varies depending upon the salinity of the body of water into which it empties. In certain cases, it may be desirable that the salinity and density of the mixed water is equivalent to that of the receiving body of water; in other cases it may be desirable that the salinity and density of the mixed water is less than that of the receiving body of water in order to maintain positive buoyancy. In other cases it may be desirable that the salinity of the mixed water does not exceed the salinity of the receiving body of water by more than 3%. For embodiments that use secondary effluent from a WWTP for the low salinity feed, the addition of salt to the secondary effluent will increase its concentration and density, and may make the discharge more environmentally friendly.

Example Calculations

The amount of energy generated from a mixing process can be estimated using ideal solution theory, which is described in any number of physical chemistry textbooks. For purposes of these calculations, the specific example of Post et al. is followed (Post, Veerman, Hamelers, Euverink, Metz, Nymeijer, Buisman, "Salinity-Gradient Power: Evaluation of Pressure-Retarded Osmosis and Reverse Electrodialysis", *Journal of Membrane Science*, volume 228, pages 218-230, 2007). The free energy E available from mixing a concentrated solution with a dilute solution is taken from equation 3 in this reference:

$$E = \sum_i (E_{i,c} + E_{i,d} - E_{i,m}) = \sum_i (c_{i,c}V_cRT\ln(x_{i,c}) + c_{i,d}V_dRT\ln(x_{i,d}) - c_{i,m}V_mRT\ln(x_{i,m}))$$

Subscripts c, d, and m refer to concentrated, dilute, and mixed solutions respectively. Subscript i refers to the number of components (two in this case: NaCl and water). V is the solution volume (for example in $m^3$), c is the concentration ($mol/m^3$), and x is mole fraction. For salt, the concentration of sodium+chloride ions is twice the concentration of NaCl. R is the gas constant, and T is absolute temperature. Following Post et al., empirical density of sodium chloride solutions as a function of salt concentration at T=293 K was used (R. C. Weast, ed., *CRC Handbook of Chemistry and Physics*, 66th Edition (1985-1986), CRC Press, Inc., Boca Raton, Fla. pages D-253-254.) to define solution volumes. The equation for free energy above represents the behavior of ideal solutions; comparison with empirical thermodynamic data indicates that predicted results are only about 10% too high, except at the highest salt concentrations. At this point, the ideal solution approximation underestimates the mixing energy. (M. E. Guendouzi, A. Dinane, A. Mounir, "Water activities, osmotic and activity coefficients in aqueous chloride solutions at T=298.15 K by the hygrometric method", *J. Chem. Thermodynamics* 33 (2001) 1059-1072.). The change in free energy is the thermodynamic entitlement of the process; the actual amount of energy recovered by a real device will depend on details of the system and process design, but 50% efficiency is not an unreasonable assumption for initial estimation purposes.

Figure 7:
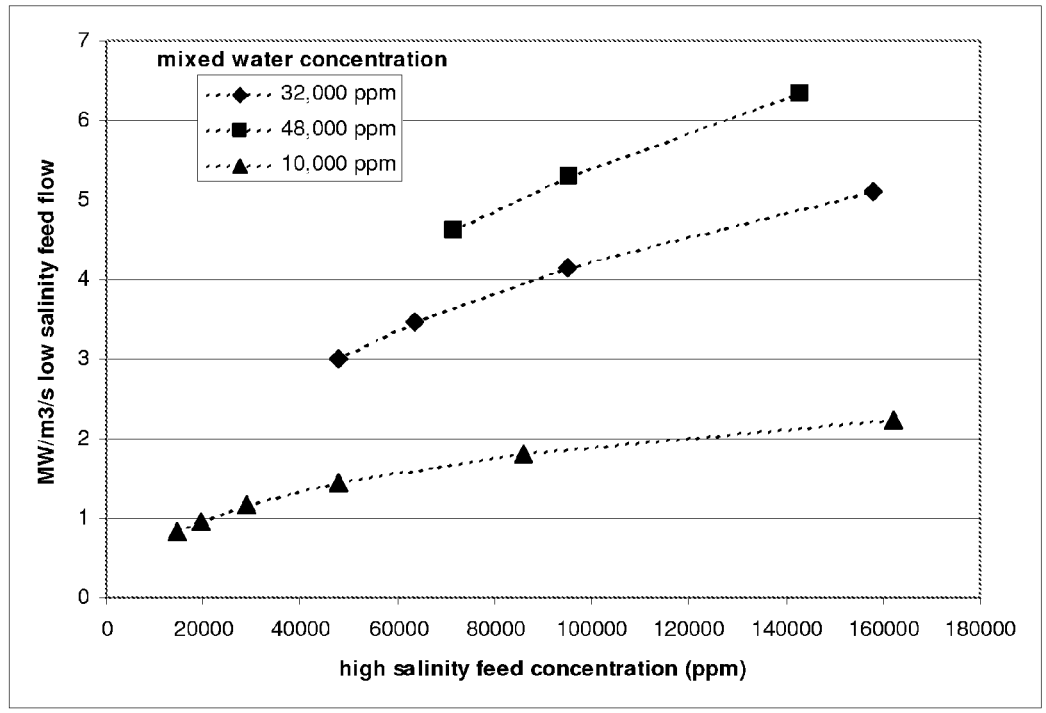
FIG. 7 shows the thermodynamic entitlement power generated from mixing a 1 m³/s low salinity stream (concentration fixed at 500 ppm) with a high salinity stream (15,000-160,000 ppm) to make mixed water (10,000-48,000 ppm).

FIG. 7 shows the thermodynamic entitlement power generated from mixing a 1 $m^3$/s low salinity stream (concentration fixed at 500 ppm) with a high salinity stream (15,000-160,000 ppm) to make mixed water (10,000-48,000 ppm). Mixing ratios are varied as necessary. Two general trends can be seen from this data. First, power generation always increases as the concentration of salt in the high salinity stream increases. This is because the energy of mixing increases with increasing difference in concentrations between the high and low salinity streams. Second, higher concentrations of mixed water output by the SGPU result in larger power production per unit volume of low salinity feed input.

Figure 8:
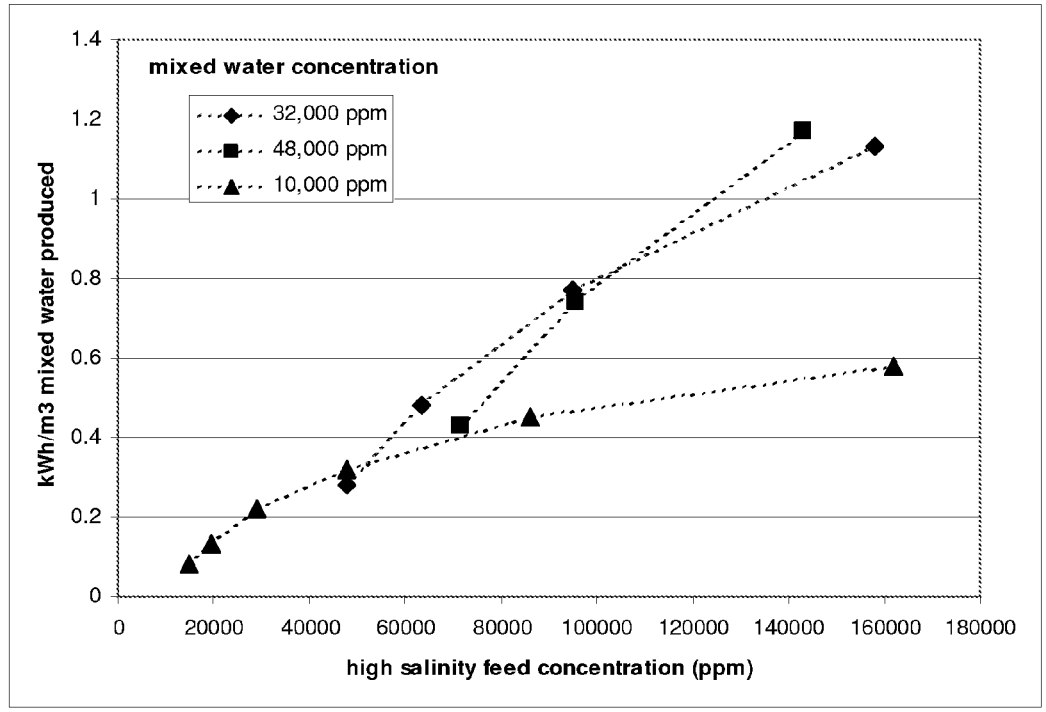
FIG. 8 shows the thermodynamic entitlement power generated per cubic meter of total water used in the process (equal to the volume of the mixed water stream) as functions of concentrations of the high salinity stream (15,000-160,000 ppm) and the mixed water stream (10,000-48,000 ppm), fixing the concentration of the low salinity stream at 500 ppm.

FIG. 8 shows the thermodynamic entitlement power generated per cubic meter of total water used in the process, (equal to the volume of the mixed water stream,) as functions of concentrations of the high salinity stream (15,000-160,000 ppm) and the mixed water stream (10,000-48,000 ppm), fixing the concentration of the low salinity stream at 500 ppm. Interestingly, the power produced at moderately low concentrations of the high salinity stream (50,000-70,000 ppm) is almost independent of the target composition of the mixed water output stream. At higher high salinity stream concentrations, the amount of power produced again trends with concentration of the mixed water output stream.

Figure 9:
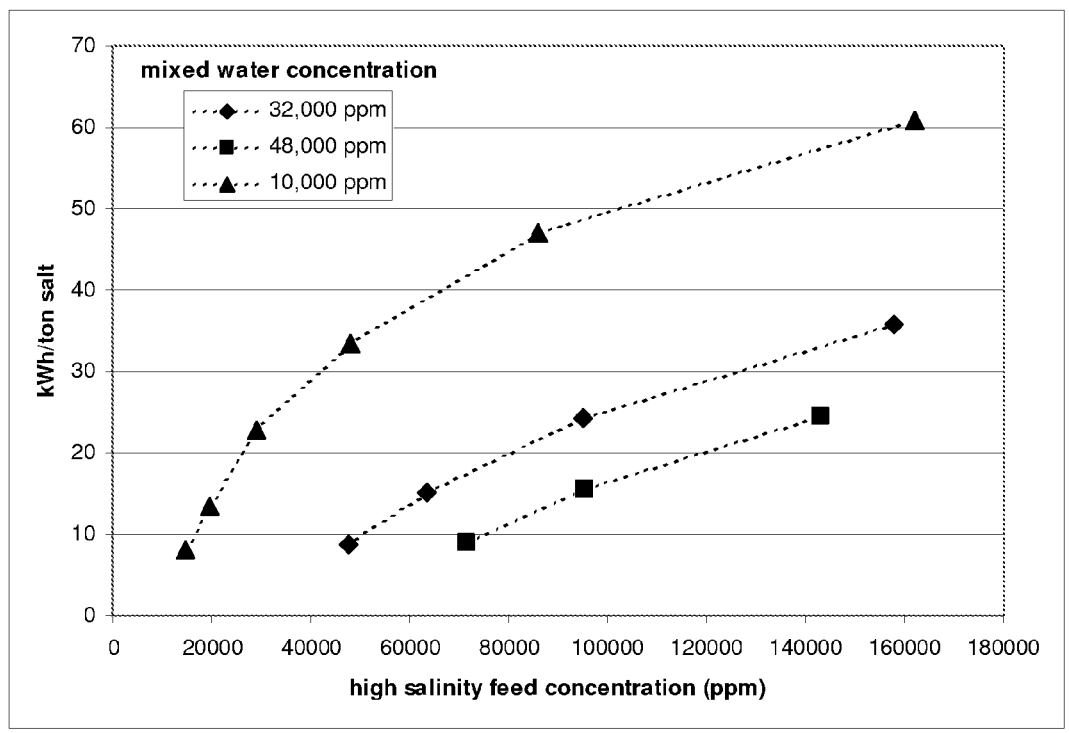
FIG. 9 shows the thermodynamic entitlement power generated per metric ton of salt present in the high salinity stream as functions of the concentrations of the high salinity stream (15,000-160,000 ppm) and the mixed water stream (10,000-48,000 ppm), fixing the concentration of the low salinity stream at 500 ppm.

FIG. 9 shows the thermodynamic entitlement power generated per metric ton of salt present in the high salinity stream as functions of the concentrations of the high salinity stream (15,000-160,000 ppm) and the mixed water stream (10,000-48,000 ppm), fixing the concentration of the low salinity stream at 500 ppm. Once again the trend is observed that the amount of power generated increases as the salt concentration in the high salinity stream increases. On the other hand, the amount of energy extracted for a given amount of salt increases as the target salinity of the mixed water output stream decreases. This is because the mixing energy continues to increase upon continued dilution of a concentrated stream. Higher dilution results in greater energy production, but requires more water.

FIGS. 7-9 taken together suggest that two general operation strategies exist for a SGPU. The first aims to minimize overall water use by setting the target concentration of the mixed water output stream to be high. This will also be the low capital cost option as the concentration difference between high and low salinity streams (and the driving force for mixing) is maximized throughout the process. High driving force results in higher power productivity per unit area of membrane. The second operational strategy aims to extract as much energy as possible from the salt in the high salinity stream by allowing dilution to proceed as far as practical. Preferably, the mixed water concentration should be greater than 5000 ppm. This strategy will maximize the amount of power generated from a limited amount of salt, but the capital cost and system size will be larger because the driving force for mixing is necessarily allowed to decline. In both strategies, increasing the concentration of the high salinity stream as high as possible is beneficial in principle.

Figure 10:
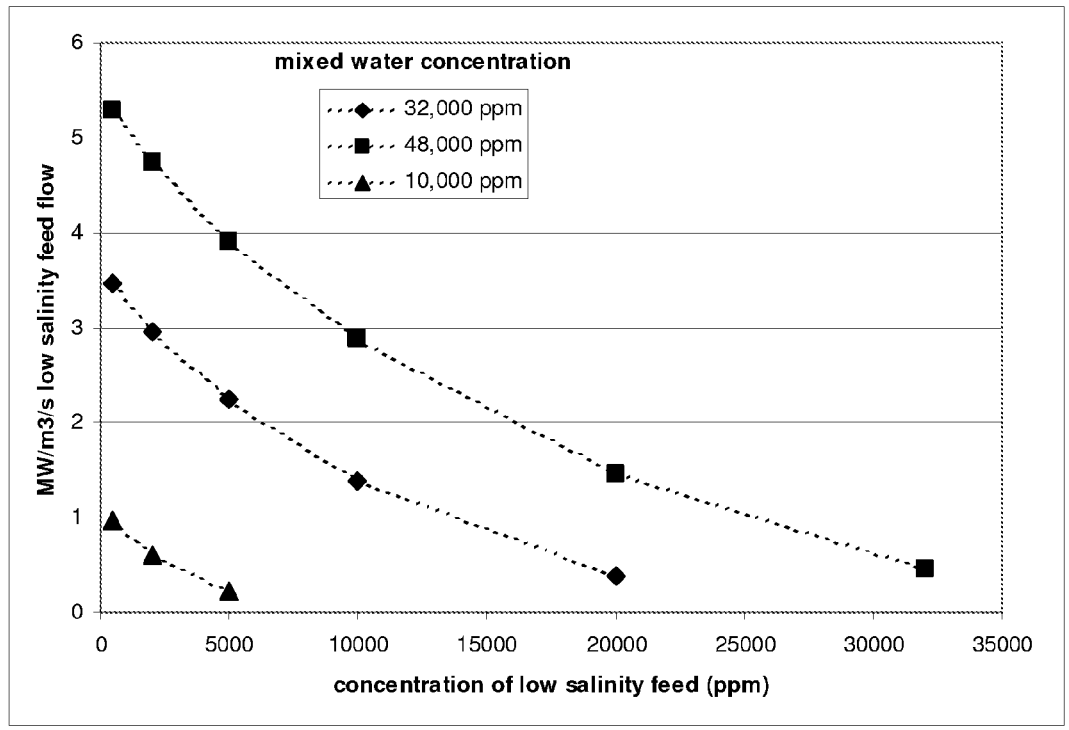
FIG. 10 shows the thermodynamic entitlement power generated from mixing a 1 m³/s low salinity stream (500-32,000 ppm) with a high salinity stream (15,000-96,000 ppm) to make mixed water (10,000-48,000 ppm), where the mixing ratio of high salinity stream volume/low salinity stream volume is set to 1.

FIG. 10 shows the thermodynamic entitlement power generated from mixing a 1 $m^3$/s low salinity stream (500-32,000 ppm) with a high salinity stream (15,000-96,000 ppm) to make mixed water (10,000-48,000 ppm), where the mixing ratio of high salinity stream volume/low salinity stream volume is set to 1. In contrast to the calculations shown in FIGS. 7-9, the concentration of the low salinity stream is varied, increasing from 500 to 32,000 ppm. The amount of power decreases as the salinity of the low salinity stream increases, as this reduces the concentration difference between low and high salinity streams. For the range of salinities in typical municipal wastewater streams (500-2000 ppm), the effect is not be very large, but if the concentration of the low salinity stream increases too far (>10,000 ppm), productivity drops off significantly. Use of seawater (32,000 ppm) for the dilute stream is unlikely to be viable in any situation. (Preferably, the salinity ratio between low and high salinity streams should be greater than 5:1.)

Typical salinity of municipal wastewater ranges from 500-2000 ppm, compared to ocean salinity of 30,000-50,000 ppm. The capacity of municipal wastewater discharges to absorb salt is immense. A hypothetical wastewater discharge of one million cubic meters per day at 500 ppm salt concentration into seawater with concentration of 30,000 ppm would require 29,500 tons/day of salt for complete "neutralization." Continuing the inland desalination example from the introduction, (100,000 m³/day, 2000 ppm brackish water salt concentration, 200 tons/day salt produced from ZLD), it would appear that municipal wastewater treatment plant discharges in coastal regions could absorb any reasonable amount of salt byproducts from inland desalination processes.

EXAMPLES

Comparative Example 1

The calculations described above can be further extended to evaluate practical scenarios. For example, as depicted in FIG. 3a, consider locating the SGPU at the site of a large wastewater treatment plant next to the ocean. Assume that the volume of the treated wastewater stream is 1 million cubic meters per day and the salt concentration is 500 ppm. A portion of this stream is used to make up the low salinity stream, and the other portion is used to rehydrate salt sent from inland ZLD desalination operations (salt assumed to be completely dry for simplicity), such that the concentration of the high salinity stream is 150,000 ppm. Three scenarios setting different concentrations of the mixed water output stream are considered: 10,000, 32,000, and 48,000 ppm. In the case where the mixed water output stream is 48,000 ppm, a portion of the low salinity stream is routed around the SGPU to dilute it down to seawater concentration (assumed to be 32,000 ppm). The results are given in Table 1.

TABLE 1

| Mixed water output stream concentration (ppm) | Volume of high salinity stream (m³/d) | Mass of ZLD salt required (ton/d) | Thermodynamic entitlement power produced (MW) | Assumed process efficiency | Power produced (MW) |
| --- | --- | --- | --- | --- | --- |
| 10,000 | 63,545 | 9,500 | 24 | 50% | 12 |
| 32,000 | 210,702 | 31,500 | 46 | 50% | 23 |
| 48,000 | 210,702 | 31,500 | 34 | 50% | 17 |

Comparative Example 2

As depicted in FIG. 3e, assume one million cubic meters per day wastewater stream to be the low salinity stream, with salt concentration of 500 ppm. Seawater (32,000 ppm) is used to rehydrate ZLD salt to 150,000 ppm. Three scenarios setting different concentrations of the mixed water output stream are considered: 10,000, 32,000, and 48,000 ppm. In the case of 48,000 ppm in the mixed water output stream, a portion of the low salinity stream is routed around the SGPU to dilute it down to seawater concentration. The results are given in Table 2.

TABLE 2

| Mixed water output stream concentration (ppm) | Volume of high salinity stream (m³/d) | Mass of ZLD salt required (ton/d) | Thermodynamic entitlement power produced (MW) | Assumed process efficiency | Power produced (MW) |
| --- | --- | --- | --- | --- | --- |
| 10,000 | 67,857 | 8,007 | 25 | 50% | 13 |
| 32,000 | 266,949 | 31,500 | 58 | 50% | 29 |
| 48,000 | 266,949 | 31,500 | 43 | 50% | 22 |

Comparative Example 3

As depicted in FIG. 3d, assume one million cubic meters per day wastewater stream to be the low salinity stream, with salt concentration of 500 ppm. Use concentrate from seawater desalination plant (64,000 ppm) to rehydrate ZLD salt to 150,000 ppm. Three scenarios setting different concentrations of the mixed water output stream are considered: 10,000, 32,000, and 48,000 ppm. In the case of 48,000 ppm in the mixed water output stream, a portion of the low salinity stream is routed around the SGPU to dilute it down to seawater concentration (32,000 ppm). The results are given in Table 3.

TABLE 3

| Mixed water output stream concentration (ppm) | Volume of high salinity stream (m³/d) | Mass of ZLD salt required (ton/d) | Thermodynamic entitlement power produced (MW) | Assumed process efficiency | Power produced (MW) |
| --- | --- | --- | --- | --- | --- |
| 10,000 | 67,857 | 5,836 | 25 | 50% | 13 |
| 32,000 | 266,949 | 22,957 | 58 | 50% | 29 |
| 48,000 | 266,949 | 22,957 | 43 | 50% | 22 |

There are several advantages of a broad, integrated approach to water resources management as described in this invention. The hard benefits for an inland desalination facility are avoidance of landfill costs and a move to a sustainable process where salt is completely removed from the local environment. This can be achieved by the process described in this invention without the complexity and cost associated with selective salt removal. Mixed salts perform equally well as pure species for power generation. Further, demand for power is essentially infinite, in contrast to the market for pure salts. The hard benefit to wastewater treatment plants and coastal communities is an additional source of clean power (which will not contribute to carbon dioxide emissions), with the added benefit of potentially greater compatibility of the final mixed water effluent with the seawater due to better matched salinity and density. "Neutralizing" low salinity wastewater with ZLD salt does not carry the heavy treatment and/or distribution infrastructure costs often associated with wastewater recycling projects, and it will not raise public issues associated with indirect potable reuse. Additionally, the current invention removes one of the major barriers to commercial deployment of salinity power by using ZLD salt to increase the concentration of the concentrated stream to a potential of many times the concentration of seawater (up to 150,000-300,000+ ppm). This greatly increases the driving force for power generation, shrinking the membrane area and capital cost. An approach that balances inland desalination, salinity power generation, water conservation, and wastewater recycling stands to maximize a nation's or region's valuable water and power resources.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention.

What is claimed is:

1. A method of generating power comprising:
    i) providing dehydrated high salinity output (DHSO) from a zero liquid discharge (ZLD) desalination plant and rehydrating said DHSO to form a rehydrated high salinity feedwater (RHSF) having a salinity content of between about 150,000-300,000 ppm;
    ii) providing a low salinity feedwater comprising effluent from a wastewater treatment plant said low salinity feedwater having a salinity content of about 500-2,000 ppm;
    iii) feeding said RHSF from i) to a salinity gradient power unit (SGPU) as a high salinity feed to said SGPU;
    iv) feeding said low salinity feedwater from ii) to a SGPU as a low salinity feed to said SGPU;
    v) generating electrical power in said SGPU;
    vi) producing a mixed water output from said SGPU; and
    vii) discharging said mixed water output into a body of water whereby the salinity of said mixed water output does not exceed the salinity of said body of water by more than 3%.

2. The method as recited in claim 1 wherein said low salinity feedwater from ii) is used to rehydrate said DHSO.

3. The method as recited in claim 1 wherein said SGPU is a reverse electrodialysis unit.

4. The method as recited in claim 1 wherein said SGPU is a pressure-retarded osmosis unit.

5. The method as recited in claim 1 wherein said mixed water output is mixed with said low salinity feedwater before being discharged into said body of water.

* * * * *